July 14, 1931.  W. E. GROVE  1,814,471
ART OF MAKING VERMIN DESTROYING MATERIAL
Filed Sept. 29, 1930

Inventor
WILLIAM E. GROVE

By Sturtevant, Mason & Porter
Attorneys

Patented July 14, 1931

1,814,471

UNITED STATES PATENT OFFICE

WILLIAM EDGAR GROVE, OF CHAMBERSBURG, PENNSYLVANIA

ART OF MAKING VERMIN DESTROYING MATERIAL

Application filed September 29, 1930. Serial No. 485,270.

This invention relates to improvements in the manufacture of vermin destroying material and more particularly to tree bands for the destruction of the larvæ of the codling moth.

Such devices have been designed to operate in various manners. The eggs of the codling moth hatch into worms or larvæ which eat into certain fruits such as the apple, pear, walnut, etc., and as they become fullgrown, the larvæ leave the fruit in order to find a safe and dry place in which to form the cocoon. With trees having scaley bark, the natural instinct of the larva is to find a snug and protected harbor beneath a scale of bark, in which the larva spins its cocoon from which the moth issues subsequently to lay the eggs for the next brood. It has been sometimes sought to kill these larvæ by placing poison food in their path in the hope that they would eat this food and die, but since they have been gorged to repletion, on the apple or other fruit, they do not eat the poisoned food or even remain in contact with it long enough for any contact action to occur.

Tree bands of cloth or crêpe paper have therefore been proposed, to be wound about a tree trunk and saturated with a chemical which is toxic to the larvæ. The intent then is that the larvæ which find harbor in this band shall be killed by contact action while it is harboring therein.

According to the present invention, a tree band material is to be provided which is thoroughly saturated with the chemical employed, and yet which is not stopped or obstructed by collections of the material.

The drawings represent diagrammatically the manner of forming the material.

Figure 1:
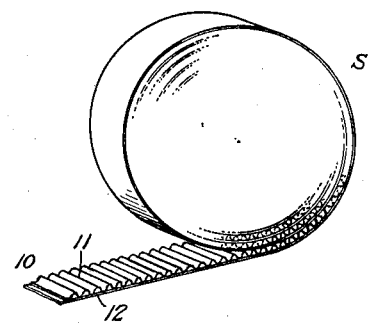
Fig. 1 shows the winding of a roll of corrugated material.

Fig. 1 shows a strip 10 of single faced corrugated material formed of a corrugated filler 11 and a liner 12 in the usual manner, being wound to form a spiral roll. The corrugations of the roll extend transversely to the length of the strip and hence are parallel to the axis of the spiral roll in the form illustrated.

Figure 2:
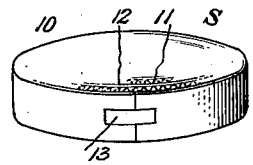
Fig. 2 shows a completed roll ready for immersion in the illustrated saturating bath.
Figure 2:
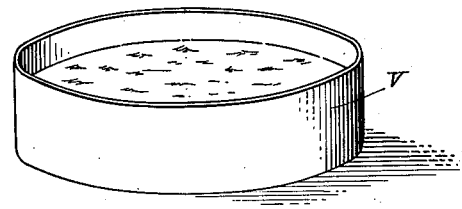

The spiral roll S thus formed is secured by pasting or otherwise securing the outer ends in position, as by the strip 13 in Fig. 2. This roll is then dipped for total immersion in a vat V containing hot saturating material. For the codling moth, it is found that a suitable toxic material is a mixture of beta-naphthol in a low grade lubricating oil with, for example, about one part by weight of the beta-naphthol to six parts by weight of the lubricating oil.

This is a very cheap and satisfactory toxic substance and operates by contact, i. e., it is not necessary for the insect to receive it through the alimentary passage since the material appears to act through the resipratory openings, and hence is highly efficient in killing the codling moth larvæ. It is preferred to heat this mixture to about 125 degrees centigrade in a large vat.

Figure 3:
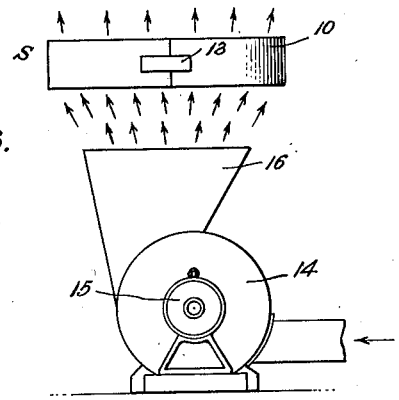
Fig. 3 shows the step of blowing a blast upwardly through the saturated roll.

The spiral roll is dipped momentarily into the vat, preferably with its axis vertical, so that the material penetrates into all of the cells formed by the corrugated board. The roll is then removed from the vat, and sustained with its axis vertical above an upwardly moving current of cooling air. In Fig. 3, the air blower 14, is driven by a suitable motor 15 and delivers the air through a nozzle 16 in an upward direction, as indicated by the arrows. In Fig. 3, the spiral roll S is shown held with a vertical axis in the path of this upwardly moving air current.

This current is preferably of such a velocity that it catches the drops hanging from the lower edges of the roll and drives them upwardly into the roll so that they are distributed and cooled therein and are prevented from gathering and remaining to obstruct any portion of the cells.

In removing the roll from the vat, it is preferred to permit it to drain for a moment.

It is further preferred, after accomplishing a first immersion with a substantially vertical axis to turn the roll upside down and accomplish another immersion immediately, again with a vertical axis and then to pass the roll, after a moment's dripping, into the upwardly moving air current for cooling and for distribution of the hanging drops.

It may be pointed out that a desirable size for the band is a width from two to three inches with a diameter of 24 to 30 inches. With these sizes, the rolls remain of a shape and size which may be easy to handle and yet contain a substantial length of the tree band material.

It is obvious that the method may be modified in many ways within the scope of the appended claims.

I claim:

1. The method of preparing saturated tree bands and like articles from single faced corrugated board which comprises cutting a strip of the board with the corrugations extending transversely to the length of the strip, winding the strip into a spiral roll with the corrugations substantially parallel to the axis, dipping the roll into a hot saturating solution, and cooling by maintaining the roll with its axis vertical in an upwardly directed air current whereby to drive any hanging drops upwardly into the roll.

2. The method as in claim 1 in which the spiral roll is dipped with its axis substantially vertical, and thereafter turned upside down and again dipped with its axis substantially vertical before being placed in the air current.

In testimony whereof, I affix my signature.

WILLIAM EDGAR GROVE.